US011421689B2

(12) United States Patent
Schofield et al.

(10) Patent No.: US 11,421,689 B2
(45) Date of Patent: Aug. 23, 2022

(54) PUMP ASSEMBLY WITH SEALING PROTRUSION ON STATOR BORE PORTION (71) Applicant: Edwards Limited, Burgess Hill (GB)

(72) Inventors: Nigel Paul Schofield, Burgress Hill (GB); Alan Ernest Kinnaird Holbrook, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 156 days.

(21) Appl. No.: 16/465,196

(22) PCT Filed: Dec. 13, 2017

(86) PCT No.: PCT/GB2017/053734
§ 371 (c)(1),
(2) Date: May 30, 2019

(87) PCT Pub. No.: WO2018/115815
PCT Pub. Date: Jun. 28, 2018

(65) Prior Publication Data
US 2019/0368489 A1 Dec. 5, 2019

(30) Foreign Application Priority Data
Dec. 19, 2016 (GB) ...................................... 1621618

(51) Int. Cl.
*F16C 33/10* (2006.01)
*F16C 33/00* (2006.01)
(Continued)

(52) U.S. Cl.
CPC ............ *F04C 25/02* (2013.01); *F04C 27/009* (2013.01); *F04C 2240/10* (2013.01); *F04C 2240/20* (2013.01); *F05C 2251/10* (2013.01)

(58) Field of Classification Search
CPC ...... F04C 25/02; F04C 27/009; F04C 23/001; F04C 18/126; F16C 17/028; F16C 17/00;
(Continued)

(56) References Cited
U.S. PATENT DOCUMENTS 4,595,349 A * 6/1986 Preston ............... F04C 29/0042
418/206.1
5,356,226 A * 10/1994 Onishi .................. F16C 17/026
384/119
(Continued)

FOREIGN PATENT DOCUMENTS

CN 203584904 U 5/2014
CN 204299860 U 4/2015
(Continued)

OTHER PUBLICATIONS

Combined Search and Examination Report under Sections 17 and 18(3) dated May 16, 2017 from counterpart GB Application No. 1621618.6, 9 pp.
(Continued)

*Primary Examiner* — Deming Wan
(74) *Attorney, Agent, or Firm* — Shumaker & Sieffert, P.A.

(57) ABSTRACT

A pump assembly may include a rotor having a rotor shaft portion; a stator having a bore portion defining a bore for receiving the rotor shaft portion; and a circumferential protrusion extending radially into the bore between the bore portion and the rotor shaft portion, wherein at least one of the protrusion and a corresponding surface of the rotor shaft portion or the bore portion is configured to be abraded by the other upon experiencing contact therewith. In this way, the gap between the bore portion and the rotor shaft portion may be at least partially filled by the circumferential protrusion in order to provide a seal. The protrusion and one of the bore
(Continued)

portion and the rotor shaft portion may be formed from different hardness materials.

15 Claims, 4 Drawing Sheets (51) Int. Cl.
| | |
|---|---|
| *F16C 17/02* | (2006.01) |
| *F16C 17/00* | (2006.01) |
| *F04C 18/12* | (2006.01) |
| *F04C 27/00* | (2006.01) |
| *F04C 25/02* | (2006.01) |

(58) Field of Classification Search
CPC . F16C 17/026; F16C 33/1055; F16C 2300/32
See application file for complete search history.

(56) References Cited

U.S. PATENT DOCUMENTS

| | | | | |
|---|---|---|---|---|
| 6,123,526 | A * | 9/2000 | Chen | F04C 23/001 418/13 |
| 8,662,869 | B2 * | 3/2014 | Suzuki | F04C 18/126 418/10 |
| 2004/0042693 | A1 * | 3/2004 | Dubreuil | F16C 17/024 384/106 |
| 2007/0132193 | A1 | 6/2007 | Wolfe et al. | |
| 2007/0248452 | A1 | 10/2007 | Brisson et al. | |
| 2011/0058930 | A1 | 3/2011 | Belcher | |
| 2011/0256003 | A1 | 10/2011 | Ohtsubo et al. | |
| 2011/0309585 | A1 | 12/2011 | Uehara et al. | |

FOREIGN PATENT DOCUMENTS

| | | |
|---|---|---|
| EP | 3064775 A1 | 9/2016 |
| GB | 1528421 | 10/1978 |
| GB | 2528450 A | 1/2016 |
| JP | S61130792 U | 8/1986 |
| JP | S63239389 A | 10/1988 |
| JP | H04203565 A | 7/1992 |
| JP | 2002228013 A | 8/2002 |
| JP | 2002339787 A | 11/2002 |
| JP | 2002339878 A | 11/2002 |
| WO | 2005047705 A1 | 5/2005 |
| WO | 2007031092 A1 | 3/2007 |
| WO | 2010146797 A1 | 12/2010 |

OTHER PUBLICATIONS

Written Opinion and International Search Report dated Feb. 15, 2018 from counterpart International Application No. PCT/GB2017/053734, 10 pp.

Notification of Reason for Refusal and translation thereof from counterpart Korean Application No. 2019-7017352 dated Jan. 6, 2022, 11 pp.

Translation of Notification of Reasons for Rejection from counterpart Japanese Application No. 2019-531232 dated Sep. 28, 2021, 4 pp.

* cited by examiner

PUMP ASSEMBLY WITH SEALING PROTRUSION ON STATOR BORE PORTION

This application is a national stage entry under 35 U.S.C. § 371 of International Application No. PCT/GB2017/053734, filed Dec. 13, 2017, which claims the benefit of GB Application 1621618.6, filed Dec. 19, 2016. The entire contents of International Application No. PCT/GB2017/053734 and GB Application 1621618.6 are incorporated herein by reference.

TECHNICAL FIELD

The present disclosure relates to a pump assembly.

BACKGROUND

Compressors and vacuum pumps are known. Vacuum pumps are typically employed as a component of a vacuum system to evacuate devices. Also, these pumps are used to evacuate fabrication equipment used in, for example, the production of semi-conductors. Rather than performing compression from a vacuum to atmosphere in a single stage using a single pump, it is known to provide multi-stage vacuum pumps where each stage performs a portion of the complete compression range required to transition from a vacuum to atmospheric pressure. Similar arrangements exist for compressors. Although such compressors and vacuum pumps provide advantages, they also have their own shortcomings. Accordingly, it is desired to provide an improved arrangement for multi-stage pumps.

SUMMARY

According to a first aspect, there is provided a pump assembly, comprising: a rotor having a rotor shaft portion; a stator having a bore portion defining a bore for receiving the rotor shaft portion; and a circumferential protrusion extending radially into the bore between the bore portion and the rotor shaft portion, one of the protrusion and a corresponding surface of the rotor shaft portion or the bore portion being configured to be abraded by the other upon experiencing contact therewith.

The first aspect recognises that a problem with existing pump assemblies is that it is often difficult to seal between the rotor and the stator to prevent leakage, especially leakage between different pumping states of a multi-stage pump. Existing seal arrangements are often complex or unsuited to the environment within a pump. For some types of pumps, existing seal arrangements are unsuitable since they expand the radial separation between the rotor and the stator, which provides a circumferential leakage path within the pump, around the seal.

Accordingly, a pump assembly or apparatus is provided. The pump assembly may comprise a rotor or rotor assembly. The rotor may have a rotor shaft portion or axle. The pump assembly may also comprise a stator or stator housing. The stator may have a bore portion or wall. The bore portion may define a bore or aperture which receives the rotor shaft portion. The pump assembly may also comprise a circumferential protrusion or ridge which extends radially into the bore. The protrusion may extend between the bore portion of the stator and the rotor shaft portion of the rotor. The protrusion and the bore portion or the protrusion and the rotor shaft portion may be so configured that when contact is experienced therebetween, one or more of the contacting surfaces is abraded. In this way, the gap between the bore portion and the rotor shaft portion may be at least partially filled by the circumferential protrusion in order to provide a seal. By using the interacting, contacting components themselves to abrade material where a clash therebetween occurs, the resulting interface very closely reflects the actual mating relationship between the surfaces of the rotor shaft portion and the bore portion for any given combination of particular components, thus providing a unique, bespoke sealing arrangement.

The protrusion and one of the bore portion and the rotor shaft portion may be formed from different hardness materials. Providing different hardness materials enables any contact between the protrusion and the bore portion or the rotor shaft portion to cause wear between the two in order to enhance the seal.

In one embodiment, contact between the protrusion and the one of the bore portion and the rotor shaft portion abrades the softer material. Accordingly, the softer material may be worn away by the harder material to provide a close, rotatable seal.

In one embodiment, one of the protrusion and the rotor shaft portion is harder than another of the bore portion and the protrusion. Accordingly, the protrusion may be harder than the bore portion or the rotor shaft portion may be harder than the protrusion. This ensures that where materials contact, one is softer than the other and the softer material is abraded. Hence, the protrusion may wear away a part of the bore portion or the rotor shaft portion may wear away a part of the protrusion to provide a close, rotatable seal. Alternatively, where the different components have similar hardness properties, material from each component may be abraded by the other.

In one embodiment, the protrusion is unitary with one of the bore portion and the rotor shaft portion. Accordingly, the protrusion may be formed as part of either the bore portion or as part of the rotor shaft portion and extend therefrom.

In one embodiment, the protrusion upstands from one of the bore portion and the rotor shaft portion. Accordingly, the protrusion may upstand or protrude from either the bore portion or the rotor shaft portion.

In one embodiment, the protrusion upstands radially by a distance which comprises up to a fitting tolerance between the bore portion and the rotor shaft portion. Accordingly, the protrusion may upstand by no more than the dimensional tolerance specified between the bore portion and the rotor shaft portion. This ensures that the protrusion can fully fit any gap between the bore portion and the rotor shaft portion under maximum tolerance.

In one embodiment, the protrusion upstands radially by the distance which comprises up to the fitting tolerance between the bore portion and the rotor shaft portion together with a displacement tolerance of the rotor shaft portion. Accordingly, the protrusion may also upstand by more than the dimensional tolerance. The protrusion may, thus, upstand by an additional tolerance which accounts for any displacement of the rotor shaft portion with respect to the bore portion, such as can occur due to temperature changes and/or vibration or other bending modes.

In one embodiment, the distance is between around 50 μm and 150 μm. It will be appreciated that the distance will vary depending on pump design and application.

In one embodiment, the protrusion has an axial width which is greater than the distance. Accordingly, the protrusion may have an axial width or length which is greater than its radial height.

In one embodiment, the axial width is between around 100 μm and 1 mm. It will be appreciated that the width will vary depending on pump design and application.

In one embodiment, the pump comprises a plurality of the protrusions axially separated along the bore. Accordingly, more than one protrusion may be provided along the axial length of the bore, in order to provide additional seals and further enhance sealing.

In one embodiment, the stator defines a plurality of bores, each having at least one the protrusion extending radially therein. Accordingly, the stator may have more than one bore and each of those bores may have one or more protrusions in order to provide a seal for each bore.

In one embodiment, the protrusion is unitary with the bore portion and the protrusion is softer than the rotor shaft portion. Accordingly, the protrusion may be provided as part of the bore portion, with the protrusion being softer than the rotor shaft portion. Accordingly, the protrusion may be abraded by any contact with the rotor shaft portion in order to shape the protrusion to fit under running contact and provide a close seal.

In one embodiment, the protrusion is unitary with the rotor shaft portion and the protrusion is harder than the bore portion. Accordingly, the protrusion may be provided as part of the rotor shaft portion, with the protrusion being harder than the bore portion. Accordingly, the bore portion may be abraded by any contact with the protrusion in order to shape the bore portion to fit under running contact and provide a close seal.

In one embodiment, the stator comprises a first housing part defining a first portion of each bore and a second housing part defining a second portion of each bore, the first housing part and the second housing part being coupleable to define each bore. Accordingly, a multi-part stator may be provided, such as a clamshell-type stator arrangement. Alternatively, a sliced arrangement of multi-stage pumping apparatus may be provided.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present disclosure will now be described further, with reference to the accompanying drawings.

DETAILED DESCRIPTION

Before discussing the embodiments in any more detail, first an overview will be provided. Embodiments provide an arrangement which improves rotational seals within a pump assembly, such as a multi-stage vacuum pump. A circumferential protrusion or rib is provided which extends radially into a bore between a rotor shaft and a stator. Relative contact between this rib and a cooperating surface of the rotor shaft or the stator bore enables the protrusion to either abrade the material it contacts, or be abraded by that material during rotation. In other words, rotating the rotor shaft within the stator causes contact and abrasion which provides for a close-running contact between the protrusion and the material it contacts. This provides for a very close seal, which prevents fluid leakage axially along the rotor. Also, because of the abrasion, it is possible to retain very tight tolerances between the rotor and the stator in order to prevent fluid circumferential leakage between an exhaust and inlet of the pump.

To further enhance this seal and encourage the abrasion mechanism, either the protrusion and the bore or the protrusion and the rotor shaft may be formed of different hardness materials.

Stator

Figure 1:
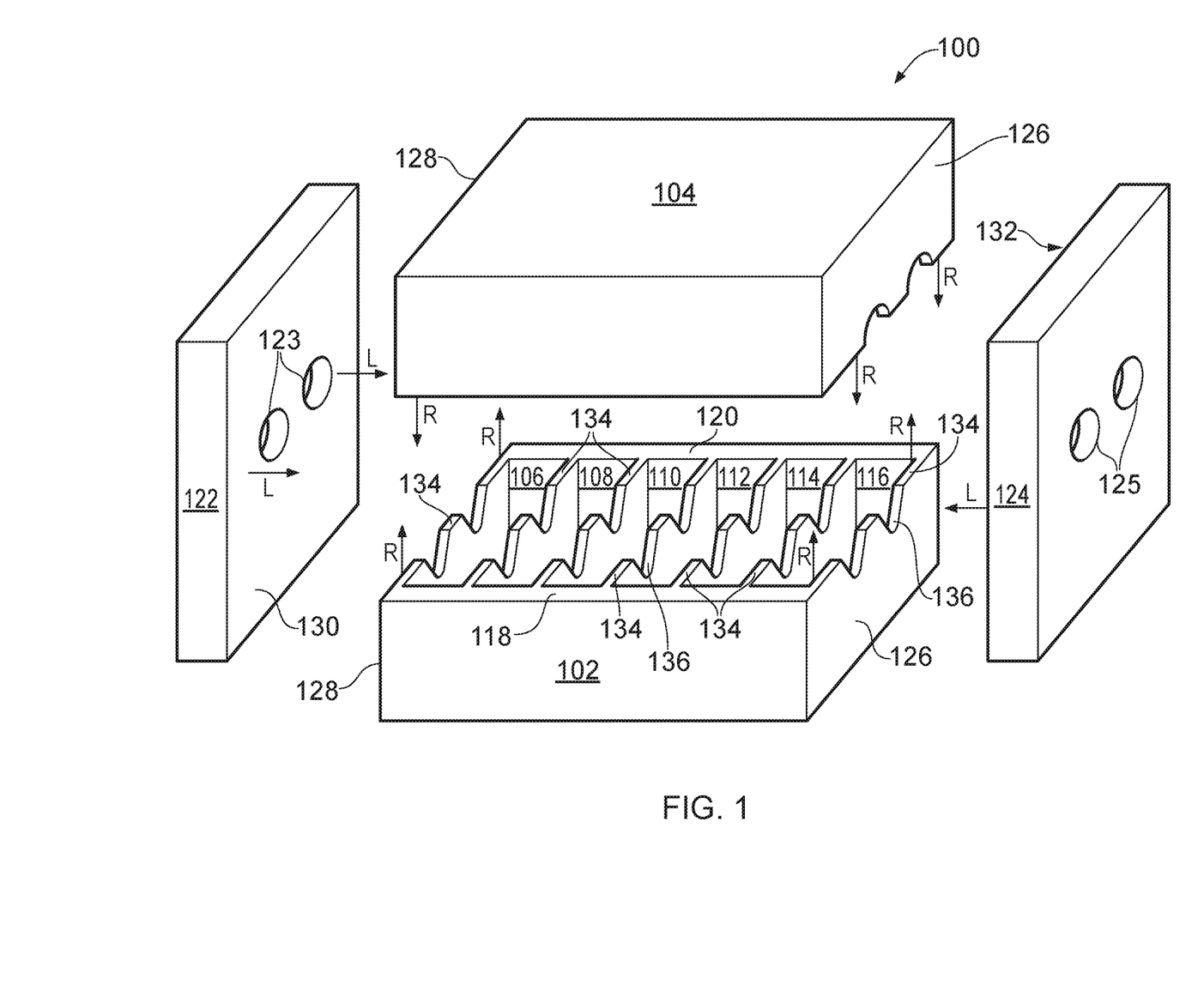
FIG. 1 is a schematic diagram showing stator components of a multi-stage roots or claw pump manufactured and assembled in the form of a clamshell.

FIG. 1 is a schematic diagram showing the main components of a multi-stage roots or claw pump manufactured and assembled in the form of a clamshell. The stator 100 of such a pump comprises first and second half-shell stator components 102, 104 which together define a plurality of pumping chambers 106, 108, 110, 112, 114, 116. Each of the half-shell stator components 102, 104 has first and second longitudinally-extending faces 118, 120 which mutually engage with the respective longitudinally-extending faces of the other half-shell stator components 102, 104 when fitted together. Only two longitudinally-extending faces 118, 120 of half-shell stator component 102 are visible in FIG. 1. During assembly, the two half-shell stator components 102, 104 are brought together in a transverse or radial direction shown by the arrows R.

The stator 100 further comprises first and second end stator components 122, 124. When the two half-shell stator components 102, 104 have been fitted together, the first and second end stator components 122, 124 are fitted to respective end faces 126, 128 of the joined two half-shell stator components 102, 104 in a generally axial or longitudinal direction shown by arrows L. Inner faces 130, 132 of the first and second end stator components 122, 124 mutually engage with respective end faces 126, 128 of the half-shell stator components 102, 104.

Each of the pumping chambers 106, 108, 110, 112, 114, 116 is formed between transverse walls 134 of the half-shell stator components 102, 104. In this schematic, the chambers are illustrated as being similarly sized, but they would usually vary in size along the length of the pump. Only the transverse walls 134 of the half-shell stator component 102 can be seen in FIG. 1. When the half-shell stator components 102, 104 are assembled, the transverse walls 134 provide axial separation between one pumping chamber and an adjacent pumping chamber, or between pumping chambers 106, 116 and the end stator components 122, 124.

Shafts of two longitudinally-extending rotors (not shown) are located in apertures 136 formed in the transverse walls 134 when the half-shell stator components 102, 104 are fitted together. Prior to assembly, lobes (not shown) are fitted to the shafts so that two lobes are located in each pumping chamber 106, 108, 110, 112, 114, 116. The end stator components 122, 124 each have two apertures 123, 125 through which the shafts extend. The shafts are supported by bearings (not shown) in the end stator components 122, 124 and are driven by a motor and gear mechanism (not shown).

Rotor

Figure 2A:
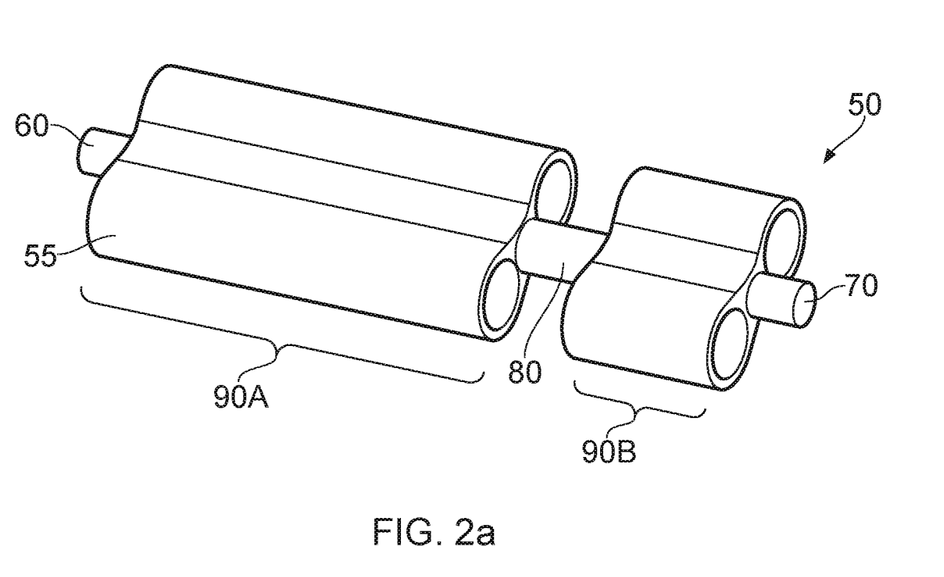
FIG. 2a is a perspective view of a simplified rotor assembly.
Figure 2B:
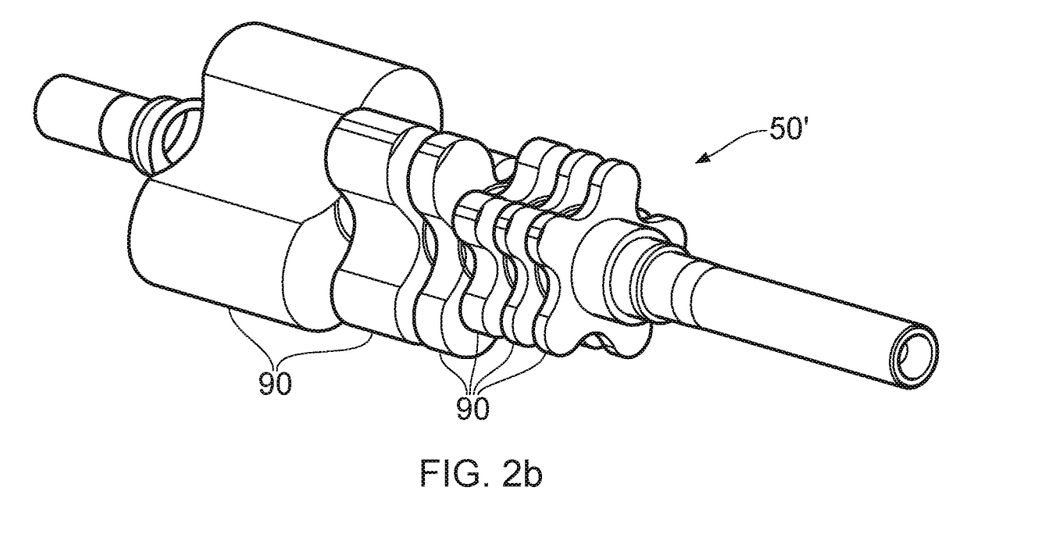
FIG. 2b is a perspective view of a rotor assembly, configured to be installed in a stator assembly of FIG. 1.

FIG. 2a is a perspective view of a simplified rotor assembly 50. In this example, a rotor assembly 50 is illustrated having two sets of lobes, but it will be appreciated that more than two sets may be provided (six sets would be required for the pump shown in FIG. 1, one set for each pumping chamber 106, 108, 110, 112, 114, 116). Also, more than two lobes may be provided in each set on the shaft (such as 3, 4 or 5 lobes) and the lobes may be of a roots, claw or other type. In FIG. 2b, a more complex rotor assembly 50' representing six stages is illustrated. Each lobed set varies in width as per the pumping requirements of the respective pumping stage. The corresponding pumping chamber 106, 108, 110, 112, 114, 116, is sized accordingly.

Returning to FIG. 2a, the simplified rotor assembly 50 is a rotor of the type used in a positive displacement lobe pump which utilises meshing pairs of lobes. The rotor assembly 50 shows pairs of lobes formed symmetrically about a rotatable shaft. Each lobe 55 is defined by alternating tangential sections of hypocycloidal and epicycloidal curves. In this example, the rotor assembly 50 is unitary, machined from a single metal element and cylindrical voids extend through the lobes 55 to reduce mass.

A first axial end 60 of the shaft is received within a bearing provided by the end stator component 122 and extends from a first rotary vane portion 90A which is received within the adjacent pumping chamber. An intermediate axial shaft portion 80 extends from the first rotary vane portion 90A and is received within the aperture 136. The aperture 136 provides a close fit on the surface of the intermediate axial shaft portion 80, but does not act as a bearing. Further rotary vane portions are then provided for each pumping chamber, each separated by an intermediate axial shaft portion. A final rotary vane portion 90B extends axially from the intermediate axial portion and is received within the final pumping chamber. A second axial end 70 extends axially from the final rotary vane portion 90B. The second axial end 70 is received by a bearing located in the aperture 125 in the end stator component 124.

The multi-stage vacuum pump operates at pressures within the pumping chamber less than atmosphere and potentially as low as 10-3 mbar.

Accordingly, there will be a pressure differential between external atmosphere and the inside of the pump. Leakage of surrounding gas into the pump and between each pumping chamber 106, 108, 110, 112, 114, 116 needs to be minimised.

Rotor-Based Seal

Figure 3:
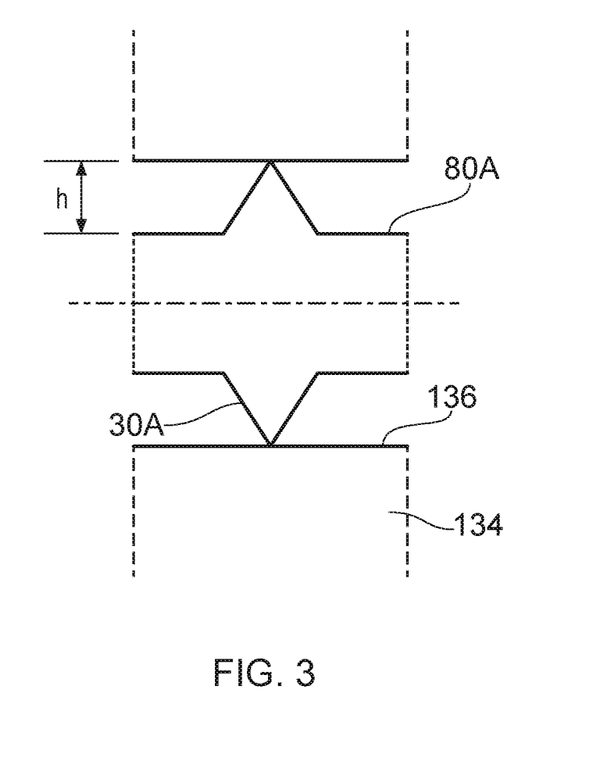
FIG. 3 illustrates a sealing arrangement for improving the seal between the shaft of the rotor and the apertures according to one embodiment.

FIG. 3 illustrates a sealing arrangement for improving the seal between the shaft of the rotor assembly 50 and the apertures 136. An intermediate axial shaft portion 80A is provided which has a ridge or protrusion 30A upstanding radially and extending circumferentially around its outer surface, as shown schematically in FIG. 3 (which is not to scale).

Typically, the height of the protrusion 30A is selected to be approximately equal to the manufacturing tolerance between the radius of the outer surface of the intermediate axial portion 80A and the radius of the aperture 136. For example, the intermediate axial portion 80A may have an external diameter of around 100 mm and the aperture 136 has an internal diameter of around 100 mm. The manufacturing tolerance of the intermediate axial portion 80A and the aperture 136 may be set to provide a gap of between 50 and 150 microns. Accordingly, the height H of the protrusion 30A may be set to this tolerance value, namely 50 to 150 μm. For arrangements where deflection of displacement of the rotor assembly 50, 50' occurs (due to, for example, bending, sagging, offset axial positioning or due to temperature effects), the height H of the protrusion 30A may also be set to include this additional displacement value/tolerance.

The material which forms the intermediate axial portion 80A may be selected to be harder than the material within which the aperture 136 is formed. In other words, the material forming the transverse walls 134 may be softer than from which the intermediate axial portion 80A is formed.

Depending on the actual relative dimensions of the intermediate axial portion 80A and the aperture 136, the protrusion 30A will either just touch or bear against the aperture 136. In this embodiment, due to the difference in hardness of the two materials, should the protrusion 30A bear against the aperture 136, then protrusion 30A will extend into the transverse wall 134 beyond the aperture 136. As the rotor rotates, a local groove will be formed on the surface of the aperture 136 due to the abrasion of the protrusion 30A on the aperture 136. Hence, a very close fit is provided between the surface of the protrusion 30A and any groove cut into the aperture 136, which provides an enhanced axial fluid seal between pumping chambers. Also, the maintenance of an otherwise tight tolerance between the external diameter of the intermediate axial portion 80A and the aperture 136 helps minimise circumferential leakage from an exhaust side of the pumping chamber back to the inlet side of that pumping chamber.

In contrast, in another embodiment, if the protrusion 30A were to be formed of a softer material than the transverse wall 134 in which the aperture 136 is formed then the abrasion experienced due to the relative movement between the two surfaces will serve to wear the protrusion 30A rather than the transverse wall 134.

In a further embodiment, the rotary assembly 50, 50' together with the corresponding protrusion 30A may be formed from the same material (or a material with substantially the same hardness properties) as that of the transverse wall 134 of the stator assembly 100. In this embodiment, the abrasion experienced due to the relative movement between the two surfaces will serve to wear both the protrusion 30A and the local surface portion of the transverse wall 134.

Aperture-Based Seal

Figure 4:
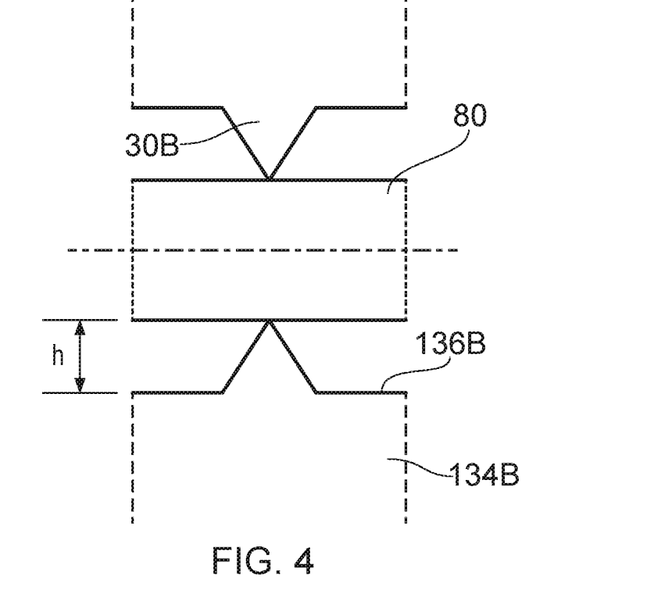
FIG. 4 illustrates a sealing arrangement for improving the seal between the shaft of the rotor and the apertures according to one embodiment.

FIG. 4 illustrates an alternative sealing arrangement for improving the seal between the shaft of the rotor and the apertures. An aperture 136B is provided which has a ridge or protrusion 30B upstanding radially and extending circumferentially around its surface, as shown schematically in FIG. 4 (which is not to scale).

Typically, the height of the protrusion 30B is selected to be approximately equal to the manufacturing tolerance between the radius of the outer surface of the intermediate axial portion 80 and the radius of the aperture 136B. For example, the intermediate axial portion 80 may have an external diameter of around 100 mm and the aperture 136B has an internal diameter of around 100 mm. The manufacturing tolerance of the intermediate axial portion 80 and the aperture 136B may be set to provide a gap of between 50 and 150 microns. Accordingly, the height H of the protrusion 30B may be set to this tolerance value, namely 50 to 150 microns. For arrangements where deflection of displacement of the rotor assembly 50, 50' occurs (due to, for example, bending, sagging, offset axial positioning or due to temperature effects), the height H of the protrusion 30B may also be set to include this additional displacement value.

The material which forms the intermediate axial portion 80 may be selected to be harder than the material from which the protrusion 30B is formed. In other words, the material forming the transverse walls 134B may be softer than that from which the intermediate axial portion 80 is formed.

Depending on the actual relative dimensions of the intermediate axial shaft portion 80 and the aperture 136B, the protrusion 30B will either just touch or bear against the intermediate axial shaft portion 80. In this embodiment, due to the difference in hardness of the two materials, should the protrusion 30B bear against the intermediate axial portion 80, then the protrusion 30B will be eroded. As the rotor rotates, the tip of the protrusion contacting the intermediate axial portion 80 will abrade. Hence, a very close fit is provided between the surface of the protrusion 30B and the intermediate axial portion 80, which provides an enhanced axial fluid seal between pumping chambers. Also, the maintenance of an otherwise tight tolerance between the external diameter of the intermediate axial portion 80 and the aperture 136B helps minimise circumferential leakage from an exhaust side of the pumping chamber back to the inlet side of that pumping chamber.

In another embodiment, if the protrusion 30B were to be formed of a harder material than the intermediate axial shaft portion 80 then the abrasion experienced due to the relative movement between the two surfaces will serve to wear the surface of the shaft portion 80 rather than the protrusion 30A.

In a further embodiment, the rotor assembly 50, 50', and thus the axial shaft portion 80, may be formed from the same material (or a material with substantially the same hardness properties) as that of the transverse wall 134B together with the corresponding protrusion 30B of the stator assembly 100. In this embodiment, the abrasion experienced due to the relative movement between the two surfaces will serve to wear both the protrusion 30B and the local surface portion of the transverse wall 134B.

Figure 5A:
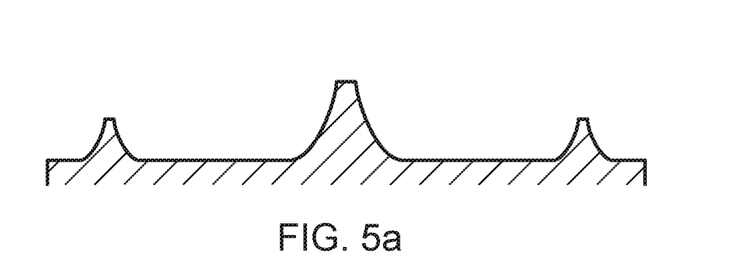
FIG. 5 show example cross-sectional profiles of a protrusion seal.

Although in the embodiments shown above, a single protrusion 30A, 30B is provided, it will be appreciated that multiple protrusions may be provided, axially spaced apart. For example, a pair of protrusions may be provided, one towards each end of the aperture 136, 136B. Also, it will be appreciated that protrusions of different heights may be provided. For example, protrusions with greater heights may be provided towards the centre of the aperture 136, 136B as illustrated in FIG. 5a. Furthermore, protrusions may be provided on both the intermediate axial portion and the aperture, extending in opposing radial directions.

Figure 5B:
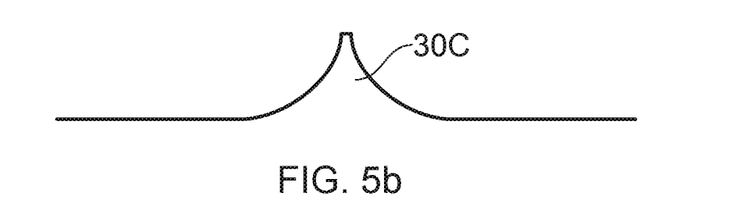
Figure 5C:
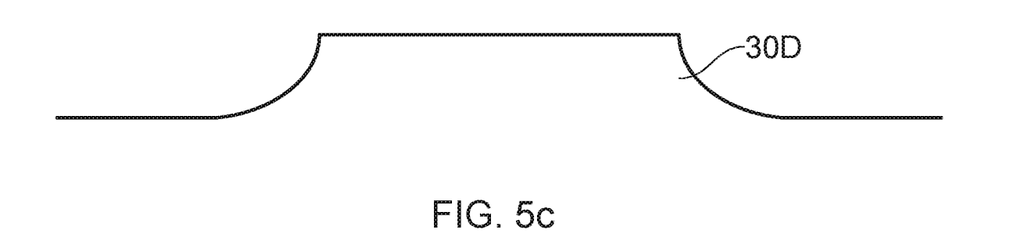

It will be appreciated that given the dimensions of the protrusions 30A, 30B, it would be difficult to machine them as shown schematically in FIGS. 3 and 4. Accordingly, FIGS. 5b and 5c show example cross-sectional profiles of example protrusions 30C, 30D. Typically, the width of an upper face of the protrusion will be around 100 microns to 1 millimetre.

In embodiments, the intermediate axial shaft portion 80A is made of steel, whereas the transverse walls 134 are made of an aluminium alloy. Alternatively, either of the components, the axial shaft portion 80 or the transverse walls 134, may comprise cast iron.

As mentioned above, embodiments aim to improve the sealing between stages on a multi-stage roots pump. One of the main leakage paths between stages is through the bore, between the shaft and the stator. In embodiments, a raised ridge is machined onto the stator, this is designed to have a marginal contact with the shaft to give good sealing against gas leaking along the shaft. In operation the ridge maybe partially worn away due to contact with the shaft. In other embodiments, the reverse arrangement is provided where the raised ridge is machined onto the rotor.

In embodiments where this stator based protrusion or ridge 30B is configured to be abraded, during operation of the pump, in preference to the rotor shaft portion 80. Enhanced sealing is achieved as the abrasion occurs locally and the abraded section, thus, remains stationary. Similar benefits are seen in the embodiment where the ridge or protrusion 30A is provided on the rotor shaft 80 and this abrades the transverse wall 134 locally upon operation of the pump. Again, the abraded section remains stationary as the rotating member follows a transitory path but the seal between the components retains its integrity through the cycle of rotation.

In contrast, when the abraded portion is located on the rotating component, wear is likely to be experienced around the entirety of the circumferential extent and thus a minimal leak path may be formed all the way around the shaft to accommodate the closest tolerance portion. A good seal will still be achieved and the leak path will be reduced but it may be less effective than in the embodiments where abrasion is experienced on the stator based components.

Multi stage roots pumps are well-known and there is a desire to provide a much lower-power pump. This requires smaller capacity exhaust stages. As the capacity of a stage is reduced, the quality of the sealing must be improved to maintain a good compression ratio. The leakage between stages, along the shaft is a key issue and becomes to dominate as the size of the stages reduce.

Embodiments use a small ridge, about 0.3 mm wide and 0.15 mm high, machined onto the stator clams or the rotor shaft to close up some of the clearance that must otherwise be left open to accommodate tolerance variation within the pump build. One or more ridges could be used. In embodiments, the stator material was chosen to be aluminium for reasons of weight-reduction and rapid machining. As this is a softer material than the cast iron shaft, it is relatively easy for the shaft to wear away excessive material and create a well-fitted seal.

The height of the ridge is only that required to take up the running clearance. A roots pump creates a high pressure on the exhaust side of the stage and this will create a circumferential flow from the exhaust side of the shaft to the inlet side. This is minimised by a close-running fit between the shaft and stator. The addition of wearable ridges does not allow the general clearance between the shaft and the stator to be increased, thus the ridges can only be sufficiently high to fit within the running tolerance band.

Unlike other seals which can often have a comparatively large radial height, embodiments must prevent both axial flow and circumferential flow, therefore the seal ridge height can only be very small, just sufficient to take up the tolerance variation. This leaves the minimum gap for gas to flow from one side of the shaft to the other in the area between stages. Improved sealing means stage sizes can be smaller and therefore power can be reduced.

It will be appreciated that this approach can be used on compressor designs or other rotating machines.

Although illustrative embodiments of the disclosure have been disclosed in detail herein, with reference to the accompanying drawings, it is understood that the disclosure is not limited to the precise embodiment and that various changes and modifications can be effected therein by one skilled in

REFERENCE SIGNS

| rotor | 50 |
| lobe | 55 |
| axial end | 60; 70 |
| intermediate axial portion | 80 |
| rotary vane portion | 90A; 90B |
| stator assembly | 100 |
| stator components | 102, 104 |
| pumping chambers | 106, 108, 110, 112, 114, 116 |
| faces | 118, 120 |
| end stator components | 122, 124 |
| end stator component apertures | 123, 125 |
| end faces | 126, 128 |
| inner faces | 130, 132 |
| transverse walls | 134 |
| apertures | 136 |
| longitudinal direction | L |
| radial direction | R |

The invention claimed is:

1. A pump assembly comprising:
a rotor having a rotor shaft portion;
a stator having a bore portion defining a plurality of bores, each of the plurality of bores for receiving the rotor shaft portion; and
a plurality of circumferential protrusions, a circumferential protrusion of the plurality of circumferential protrusions extending radially into a bore of the plurality of bores between the bore portion and the rotor shaft portion, wherein at least one of the circumferential protrusion and a corresponding surface of the rotor shaft portion or the bore portion is configured to be abraded by the other upon experiencing contact therewith;
wherein the circumferential protrusion of the plurality of circumferential protrusions upstands from the bore portion and is unitary with the bore portion;
wherein each bore of the plurality of bores has at least one circumferential protrusion of the plurality of circumferential protrusions extending radially therein; and
wherein the circumferential protrusion upstands radially by the distance which comprises up to a fitting tolerance between the bore portion and the rotor shaft portion together with a displacement tolerance of the rotor shaft portion.

2. The pump assembly of claim 1, wherein the protrusion and the rotor shaft portion are formed from different hardness materials.

3. The pump assembly of claim 2, wherein contact between the circumferential protrusion and the rotor shaft portion abrades the softer material.

4. The pump assembly of claim 1, wherein one of the circumferential protrusion or the rotor shaft portion is harder than another of the bore portion and the circumferential protrusion.

5. The pump assembly of claim 1, wherein the circumferential protrusion upstands radially by a distance which comprises up to the fitting tolerance between the bore portion and the rotor shaft portion.

6. The pump assembly of claim 5, wherein the circumferential protrusion upstands radially by the distance which comprises up to the fitting tolerance between the bore portion and the rotor shaft portion together with the displacement tolerance of the rotor shaft portion.

7. The pump assembly of claim 5, wherein the distance is between about 50 μm and about 150 μm.

8. The pump assembly of claim 5, wherein the circumferential protrusion has an axial width which is greater than the distance.

9. The pump assembly of claim 8, wherein the axial width is between about 100 μm and about 1 mm.

10. The pump assembly of claim 8, comprising a plurality of the circumferential protrusions axially separated along the bore.

11. The pump assembly of claim 1, wherein the circumferential protrusion is softer than the rotor shaft portion.

12. The pump assembly of claim 1, wherein the stator comprises a first housing part defining a first portion of the bore and a second housing part defining a second portion of the bore, the first housing part and the second housing part being configured to be coupled to define the bore.

13. The pump assembly of claim 12, wherein the pump assembly is in the form of a clamshell, and the first and second housing parts are half-shell stator housing of the clamshell each having transverse walls, and the bore is formed in the transverse walls.

14. A multi-stage vacuum pump comprising:
a rotor having a rotor shaft portion;
a stator having a bore portion defining a bore for receiving the rotor shaft portion; and
a circumferential protrusion extending radially into the bore between the bore portion and the rotor shaft portion, wherein at least one of the circumferential protrusion and a corresponding surface of the rotor shaft portion or the bore portion is configured to be abraded by the other upon experiencing contact therewith;
wherein the circumferential protrusion upstands from the bore portion and is unitary with the bore portion;
wherein the circumferential protrusion upstands radially by a distance which comprises up to a fitting tolerance between the bore portion and the rotor shaft portion together with a displacement tolerance of the rotor shaft portion;
wherein the stator defines a plurality of bores, each bore of the plurality of bores having at least one of the circumferential protrusions extending radially therein; and
wherein the circumferential protrusion is softer than the rotor shaft portion.

15. A multi-stage vacuum pump comprising:
a rotor having a rotor shaft portion;
a stator having a bore portion defining a bore for receiving the rotor shaft portion; and
a circumferential protrusion extending radially into the bore between the bore portion and the rotor shaft portion, wherein the circumferential protrusion and a corresponding surface of the rotor shaft portion or the bore portion is configured to be abraded by the other upon experiencing contact therewith;
wherein the circumferential protrusion upstands from the bore portion and is unitary with the bore portion;
wherein the circumferential protrusion upstands radially by a distance which comprises up to a fitting tolerance between the bore portion and the rotor shaft portion together with a displacement tolerance of the rotor shaft portion;

wherein the stator defines a plurality of bores, each bore of the plurality of bores having at least one of the circumferential protrusions extending radially therein;

wherein the stator comprises a first housing part defining a first portion of the bore and a second housing part defining a second portion of the bore, the first housing part and the second housing part being configured to be coupled to define the bore; and wherein the pump assembly is in the form of a clamshell, and the first and second housing parts are half-shell stator housing of the clamshell each having transverse walls, and the bore is formed in the transverse walls.

* * * * *